(12) United States Patent
Chuang et al.

(10) Patent No.: US 8,684,579 B2
(45) Date of Patent: Apr. 1, 2014

(54) ELECTRONIC DEVICE

(75) Inventors: Wan-Li Chuang, Taipei (TW);
Chien-Min Chang, Taipei (TW);
Li-Jung Yu, Taipei (TW); Mei-Hsiung Tsai, Taipei (TW); Yung-Ching Chang, Taipei (TW); Ju-Chen Chiu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 113 days.

(21) Appl. No.: 13/477,062

(22) Filed: May 22, 2012

(65) Prior Publication Data
US 2013/0265799 A1    Oct. 10, 2013

(30) Foreign Application Priority Data

Apr. 6, 2012  (TW) .............................. 101112264 A

(51) Int. Cl.
*F21V 7/04*    (2006.01)
(52) U.S. Cl.
USPC ........... 362/602; 362/615; 362/617; 362/606; 362/85; 362/23.02
(58) Field of Classification Search
USPC ............... 362/602, 605, 60, 26, 27, 615, 617; 341/22, 28
See application file for complete search history.

(56) References Cited

U.S. PATENT DOCUMENTS

| | | | | |
|---|---|---|---|---|
| 5,975,711 A | * | 11/1999 | Parker et al. | 362/24 |
| 8,431,843 B2 | * | 4/2013 | Chen | 200/5 A |
| 2012/0155062 A1 | * | 6/2012 | Weng | 362/85 |

FOREIGN PATENT DOCUMENTS

| | | |
|---|---|---|
| TW | I228738 | 3/2005 |
| TW | M353383 | 3/2009 |

* cited by examiner

*Primary Examiner* — Ali Alavi
(74) *Attorney, Agent, or Firm* — Jianq Chyun IP Office

(57) ABSTRACT

An electronic device includes a display module, a base and a keyboard module. The display module is pivoted on the base. The keyboard module is disposed on the base. The keyboard module has a plurality of keys. Each of the keys includes a main body and an imprinted structure. The main body has a top surface. The imprinted structure is disposed on the top surface of the main body and includes a light guiding portion and a light scattering portion. A light emitted by the display module illuminates the keyboard module. The light is guided towards a specific direction when the light passes through the light guiding portion, and the light is scattered in other directions when the light passes through the light scattering portion.

10 Claims, 5 Drawing Sheets

ELECTRONIC DEVICE

CROSS-REFERENCE TO RELATED APPLICATION

This application claims the priority benefit of Taiwan application serial no. 101112264, filed on Apr. 6, 2012. The entirety of the above-mentioned patent application is hereby incorporated by reference herein and made a part of this specification.

BACKGROUND OF THE INVENTION

1. Field of the Invention

The invention relates to an electronic device, and more particularly to an electronic device having a keyboard module.

2. Description of Related Art

With the flourishing advancement of technology, the types and functions of electronic devices are becoming ever more diverse. Regardless of the type of the electronic device, for users, the traditional and common method of using the electronic device is to press physical keys on the device to perform various operations.

When the users try to operate the electronic device in a dark environment, the low lighting causes difficulty in the operation of the keys. For this reason, some electronic devices provide additional light sources under their keys, thereby assisting the users in locating the keys clearly. However, additional light sources for keys incur additional costs in production and assembly, consume more power and are consequently less environmental friendly. In consequence, a simpler design that allows the users to conveniently operate the keys in dark environments is an important issue in the field of designs of current electronic devices.

SUMMARY OF THE INVENTION

The invention provides an electronic device having keys that can be easily identified with light emitted from a display module.

The invention proposes an electronic device including a display module, a base, and a keyboard module. The display module is pivoted on the base. The keyboard module is disposed on the base. The keyboard module has a plurality of keys. Each of the keys includes a main body and an imprinted structure. The main body has a top surface. The imprinted structure is disposed on the top surface of the main body and includes a light guiding portion and a light scattering portion. A light emitted by the display module illuminates the keyboard module. When a light passes through the light guiding portion, the light is directed towards a specific direction, and when the light passes through the light scattering portion, the light is scattered in other directions.

In an embodiment of the invention, there is an included angle between the above-mentioned specific direction and the top surface of the main body, and the included angle is approximately 45 degrees.

In an embodiment of the invention, the light guiding portion of the above-mentioned imprinted structure has a first concave-convex structure, and the light scattering portion has a second concave-convex structure, wherein an arrangement density of the first concave-convex structure is lower than an arrangement density of the second concave-convex structure.

In an embodiment of the invention, the light guiding portion of the above-mentioned imprinted structure has a first concave-convex structure, and the light scattering portion has a second concave-convex structure, wherein the first concave-convex structure has a larger thickness than the second concave-cave-convex structure.

In an embodiment of the invention, the above-mentioned light guiding portion has a first concave-convex structure, and the first concave-convex structure has a plurality of protrusions, and each of the protrusions has a top corner, and an angle of the top corner is between 80 and 100 degrees.

In an embodiment of the invention, each of the above-mentioned keys further includes a print layer disposed between the main body and the imprinted structure.

In an embodiment of the invention, the above-mentioned print layer has a text symbol area. The light guiding portion is disposed corresponding to the text symbol area.

In an embodiment of the invention, the above-mentioned print layer has a non-text symbol area. The light guiding portion is disposed corresponding to the non-text symbol area.

In an embodiment of the invention, the above-mentioned imprinted structure is a transparent paint. After the transparent paint is disposed on the main body, a mold imprints the paint to form simultaneously both the light guiding portion and the light scattering portion.

In an embodiment of the invention, a material of the above-mentioned imprinted structure is a heat cured resin, a radiation cured resin or an electron beam cured resin.

In light of the above, when the display module of the electronic device of the invention emits light onto the keyboard module, the light guiding portion on each key directs the light towards a specific direction, and the light scattering portion on each key scatters the light in other directions, thereby creating a difference in luminance between the light guiding portion and the light scattering portion. When a user operates the electronic device in a dark environment, the difference in luminance between the light guiding portion and the light scattering portion assists the user in clearly distinguishing the keys. Since the keys use the light emitted from the display module to induce the difference in luminance between the light guiding portion and light scattering portion and does not require additional light sources corresponding to the keys to be installed, the production and assembly costs are reduced.

In order to make the aforementioned features and advantages of the invention more comprehensible, embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
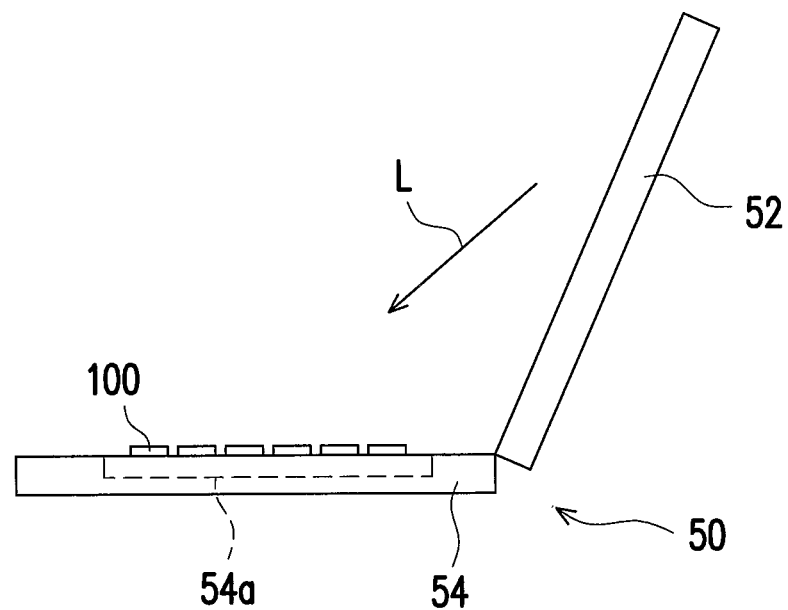
FIG. 1 is a schematic view of the electronic device of an embodiment of the invention.

FIG. 1 is a schematic view of an electronic device of an embodiment of the invention. Referring to FIG. 1, an electronic device 50 of the present embodiment is, for example, a notebook computer and includes a display module 52 and a base 54. The display module 52 (shown as open) is pivoted on the base 54 and is suited to be opened and closed on the base 54. A keyboard module 54a is disposed on the base 54 and has a plurality of keys 100 for a user to press.

Figure 2:
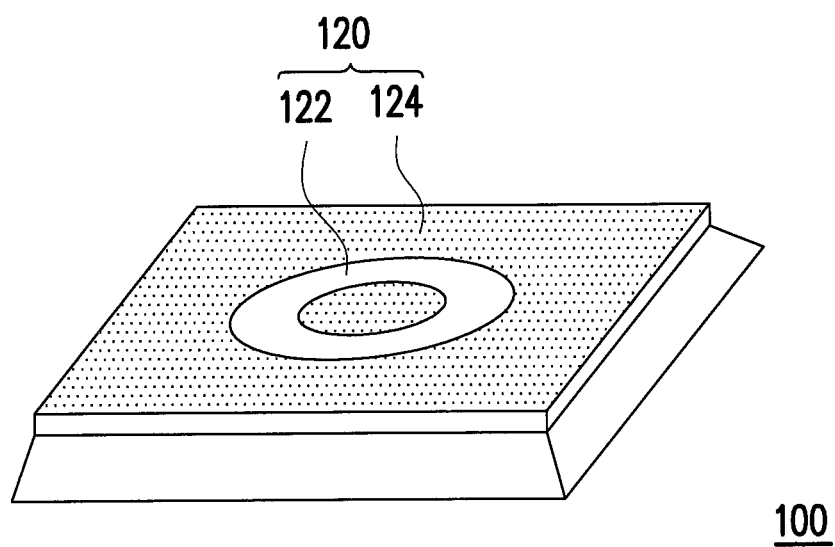
FIG. 2 is a three dimensional view of a key in FIG. 1
Figure 3:
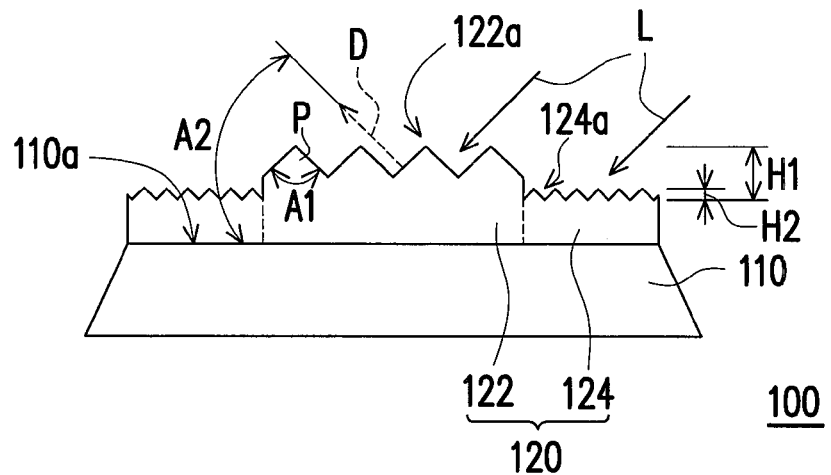
FIG. 3 is a cross-sectional view of the key in FIG. 2

FIG. 2 is a three dimensional view of a key in FIG. 1. FIG. 3 is a cross-sectional view of the key in FIG. 2. Referring to FIGS. 2 and 3, the key 100 includes a main body 110 and an imprinted structure 120. The main body 110 is disposed on the base 54 illustrated in FIG. 1 and has a top surface 110a. The imprinted structure 120 is installed on the top surface 110a of the main body 110 and includes a light guiding portion 122 and a light scattering portion 124.

When the display module 52 in FIG. 1 displays a screen, the display module 52 emits light L. When the light L illuminates the imprinted structure 120, as shown in FIG. 3, and passes through the light guiding portion 122, the light guiding portion 122 directs the light L towards a specific direction D. When the light L passes through the light scattering portion 124, the light L is scattered in other directions. Therefore, a difference in luminance between the light guiding portion 122 and the light scattering portion 124 is created. Thus, by taking note of the difference in luminance between the light guiding portion 122 and the light scattering portion 124, the user may clearly distinguish the keys 100 in a dark environment when using the electronic device 50. Moreover, since the keys 100 uses the light L emitted from the display module 52 to create the difference in luminance between the light guiding portion 122 and the light scattering portion 124 and does not require additional light sources corresponding to the keys 100 to be installed, the production and assembly costs are reduced.

Referring to FIG. 3, the light guiding portion 122 of the imprinted structure 120 of the present embodiment has a first concave-convex structure 122a, and the light scattering portion 124 has a second concave-convex structure 124a, wherein the first concave-convex structure 122a has a lower arrangement density than the second concave-convex structure 124a. Therefore, the light L produces a light guiding effect when illuminating the light guiding portion 122, and the light L produces a scattering effect when illuminating the light scattering portion 124.

Specifically, each light guiding portion 122 on the keys 100 on the base 54 forms different letters or symbols, respectively, allowing for the user's identification. For example, the light guiding portion 122 shown in FIG. 2 forms a number "0." Therefore, when the light L illuminates the imprinted structure 120, the light guiding portion 122 collects and reflects the light L and allows the user to see the number "0" shining on the key 100 in the dark.

Referring to FIG. 3, in the present embodiment, the first concave-convex structure 122a may be designed to have an appropriate shape to make an included angle A2 between the specific direction D and top surface 100a approximately 45 degrees, thereby reflecting the light L to the user's location. Specifically, the first concave-convex structure 122a has many protrusions P, and each of the protrusions P has a top corner A1. An angle of the top corner A1 is, for example, between 80 degrees and 100 degrees. The invention does not limit the shapes of the first concave-convex structure 122a. Besides the shape shown in FIG. 3, the first concave-convex structure 122a can be designed according to needs into any shape appropriate for directing the light. Similarly, the invention does not limit the shapes of the second concave-convex structure 124a. Besides the shape shown in FIG. 3, the second concave-convex structure 124a can be designed according to needs into any shape appropriate for scattering the light.

In the present embodiment, a thickness H1 of the first concave-convex structure 122a is larger than a thickness H2 of the second concave-convex structure 124a, so that the light guiding portion 122 is protruding relative to the light scattering portion 124, thereby allowing the user to identify via touch the letter or symbol formed by the light guiding portion 122.

Figure 4:
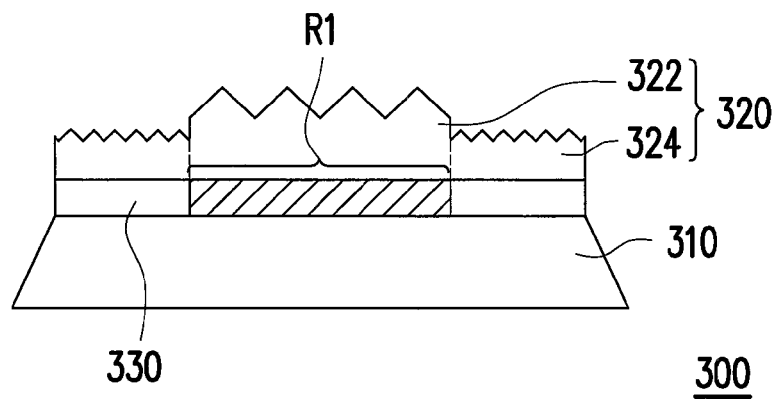
FIG. 4 is a cross-sectional view of a key according to another embodiment of the invention.

FIG. 4 is a cross-sectional view of a key of another embodiment of the invention. Referring to FIG. 4, in a key 300 of the present embodiment, configurations of a main body 310, an imprinted structure 320, a light guiding portion 322, and a light scattering portion 324 are similar to configurations of the main body 110, the imprinted structure 120, the light guiding portion 122, and the light scattering portion 124; repeated descriptions thereof are omitted. The key 300 of the present embodiment further includes a print layer 330 which is disposed between the main body 310 and the imprinted structure 320 and has a text symbol area R1. The imprinted structure 320 is made of a transparent material and covers the print layer 330. The light guiding portion 322 is disposed corresponding to the text symbol area R1. In addition to using the difference in luminance between the light guiding portion 322 and the light scattering portion 324 to distinguish the letter or symbol represented by the key 300, the text or symbol shown on the print layer 330 can also be seen through the transparent imprinted structure 320.

Figure 5:
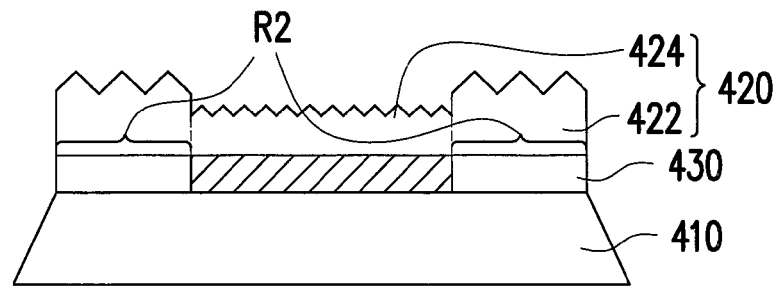
FIG. 5 is a cross-sectional view of a key according to another embodiment of the invention.

FIG. 5 is a cross-sectional view of a key of yet another embodiment of the invention. Referring to FIG. 5, in a key 400 of the present embodiment, configurations of a main body 410, an imprinted structure 420, a light guiding portion 422, and a light scattering portion 424 are similar to the configurations of the main body 110, the imprinted structure 120, the light guiding portion 122, and the light scattering portion 124; repeated descriptions thereof are omitted. The key 400 of the present embodiment further includes a print layer 430 which is disposed between the main body 410 and the imprinted structure 420 and has a non-text symbol area R2. The imprinted structure 420 is made of a transparent material and covers the print layer 430. The light guiding portion 422 is disposed corresponding to the non-text symbol area R2. The user can use the difference in luminance between the light guiding portion 422 and the light scattering portion 424 to distinguish the letter or symbol represented by the key 400.

Figure 6A:
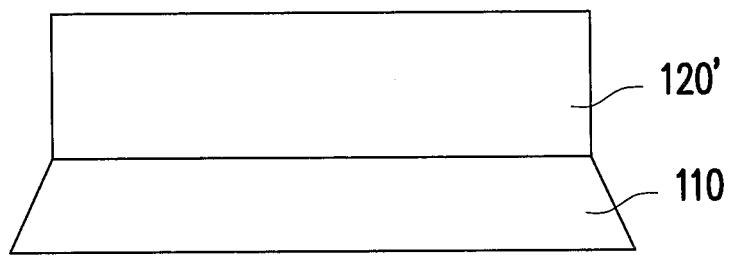
FIGS. 6A to 6C are flow charts of a production method of the key in FIG. 3.
Figure 6B:
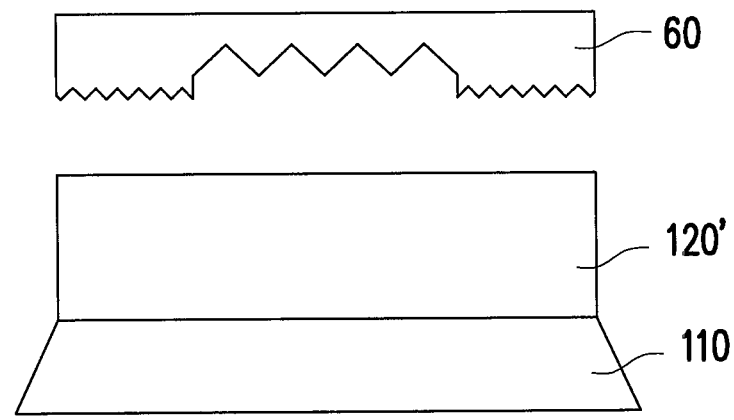
Figure 6C:
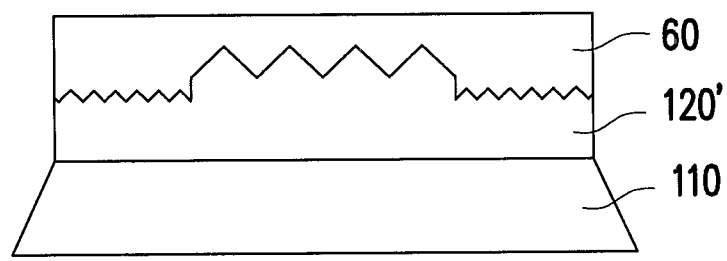

The following is a description of a production method of the key in FIG. 3. FIGS. 6A to 6C are flow charts of a production method of the key in FIG. 3. First, the main body 110 is provided and a transparent paint 120' is disposed on the main body, as shown in FIG. 6A. Next, as shown in FIGS. 6B and 6C, a mold 60 is used to imprint the transparent paint 120'. The imprinted transparent paint 120' forms the imprinted structure 120, as shown in FIG. 3 after solidifying, thus completing a production of the key 100.

In the present embodiment, a letter or symbol (shown as the number "0") is formed by the light guiding portion 122 as shown in FIG. 2 by imprinting the transparent paint 120' with the mold 60. In other embodiments, other letters or symbols can be formed by the light guiding portion with molds of other appropriate shapes.

In the present embodiment, the mold 60 imprints the transparent paint 120' to simultaneously form the light guiding portion 122, the first concave-convex structure 122a, the light scattering portion 124 and the second concave-convex structure 124a, as shown in FIG. 3. In other embodiments, the light guiding portion 122 and the first concave-convex structure 122a may be formed first by imprinting the transparent paint 120' with a mold, and then the light scattering portion 124 and the second concave-convex structure 124a may be formed by imprinting the transparent paint 120' with another mold. Alternatively, the light scattering portion 124 and the second concave-convex structure 124a may be formed first by imprinting the transparent paint 120 with a mold, and then the light guiding portion 122 and the first concave-convex structure 122a may be formed by imprinting the transparent paint 120 with another mold, which is not limited in the invention.

Figure 7A:
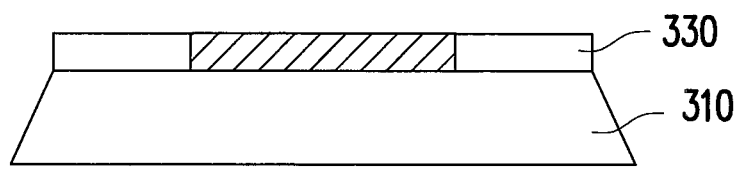
FIGS. 7A to 7D are flow charts of a production method of the key in FIG. 4.
Figure 7B:
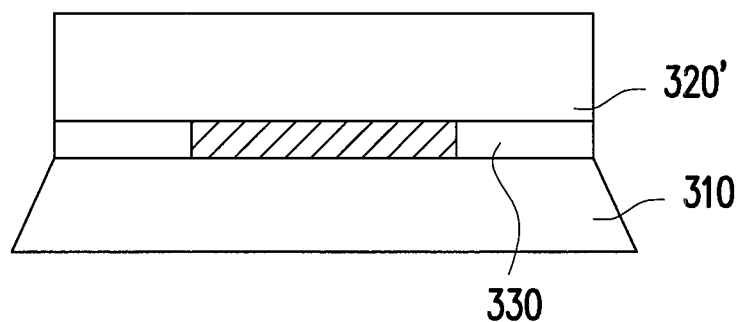
Figure 7C:
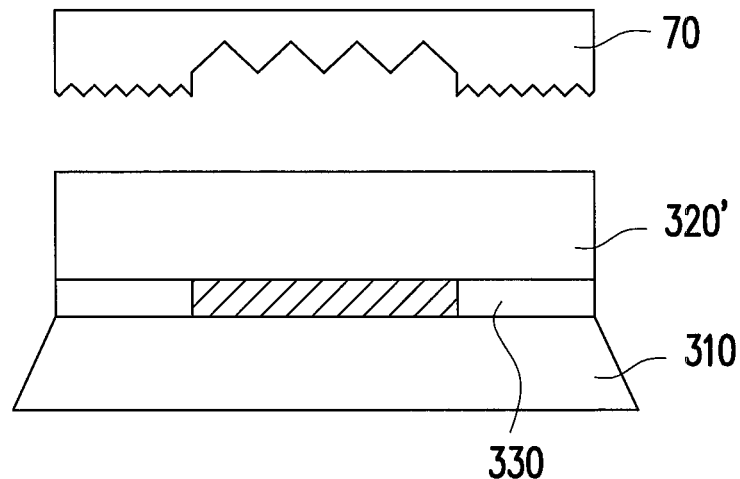
Figure 7D:
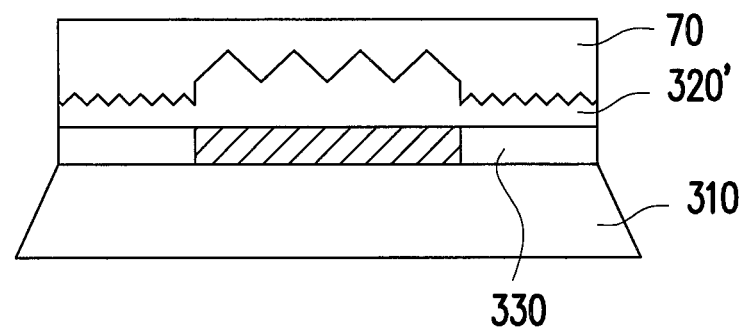

The following is a description of a production method of the key in FIG. 4. FIGS. 7A to 7D are flow charts of a production method of the key in FIG. 4. First, the main body 310 is provided and the print layer 330 is disposed on the main body 310, as shown in FIG. 7A, wherein the print layer 330 forms a letter or symbol. Next, a transparent paint 320' is disposed on the main body and covers the print layer 330, as shown in FIG. 7B. Next, a mold 70 is used to imprint the transparent paint 320', as shown in FIGS. 7C and 7D. The imprinted transparent paint 320 forms the imprinted structure 320 shown in FIG. 4 after solidifying, thus completing a production of key 300, wherein the light guiding portion 322 is aligned with the print layer 330.

In the above embodiments, a material of the imprinted structures is, for example, a heat cured resin, a radiation cured resin or an electron beam cured resin or other suitable materials, which is not limited in the invention.

In summary of the above, when the display module of the electronic device of the invention emits light onto the keyboard module, the light guiding portion on each key directs the light toward a specific direction, while the light scattering portion on each key scatter the light in different directions, thereby inducing a difference in luminance between the light guiding portion and the light scattering portion. When a user uses the electronic device in a dark environment, the keys can be clearly identified by this difference in luminance between the light guiding portion and the light scattering portion. Since the keys use the light emitted from the display module to create the difference in luminance between the light guiding portion and the light scattering portion and does not require additional light sources corresponding to the keys to be installed, the production and assembly costs are reduced. Moreover, the print layer may be disposed on the main body and covered by the imprinted structure, thus allowing the user to see through the transparent imprinted structure and observe the letter or symbol displayed on the print layer in addition to identifying the letter or symbol represented by the key through the difference in luminance between the light guiding portion and the light scattering portion.

Though the invention has been disclosed above by the embodiments, they are not intended to limit the invention. It will be apparent to one of ordinary skill in the art that modifications and variations to the invention may be made without departing from the spirit and scope of the invention. Therefore, the protection scope of the invention falls in the appended claims.

What is claimed is:

1. An electronic device comprising:
a display module;
a base on which the display module is pivoted; and
a keyboard module disposed on the base, wherein the keyboard module has a plurality of keys, and each of the keys comprises:
a main body with a top surface; and
an imprinted structure disposed on the top surface of the main body and comprising a light guiding portion and a light scattering portion, wherein a light emitted by the display module illuminates the keyboard module, the light is directed towards a specific direction when the light passes through the light guiding portion, and the light is scattered in other directions when the light passes through the light scattering portion.

2. The electronic device according to claim 1, wherein there is an included angle between the specific direction and the top surface of the main body, and the included angle is approximately 45 degrees.

3. The electronic device according to claim 1, wherein the light guiding portion of the imprinted structure has a first concave-convex structure, and the light scattering portion of the imprinted structure has a second concave-convex structure, wherein an arrangement density of the first concave-convex structure is lower than an arrangement density of the second concave-convex structure.

4. The electronic device according to claim 1, wherein the light guiding portion of the imprinted structure has a first concave-convex structure, and the light scattering portion of the imprinted structure has a second concave-convex structure, wherein a thickness of the first concave-convex structure is larger than a thickness of the second concave-convex structure.

5. The electronic device according to claim 1, wherein the light guiding portion has a first concave-convex structure, the first concave-convex structure has a plurality of protrusions, each of the protrusions has a top corner, and the top corner has an angle between 80 and 100 degrees.

6. The electronic device according to claim 1, wherein each of the keys further includes a print layer disposed between the main body and the imprinted structure.

7. The electronic device according to claim 6, wherein the print layer has a text symbol area, and the light guiding portion is disposed corresponding to the text symbol area.

8. The electronic device according to claim 6, wherein the print layer has a non-text symbol area, and the light guiding portion is disposed corresponding to the non-text symbol area.

9. The electronic device according to claim 1, wherein the imprinted structure is a transparent paint, and after the transparent paint is disposed on the main body, a mold imprints the paint to simultaneously form the light guiding portion and the light scattering portion.

10. The electronic device according to claim 1, wherein a material of the imprinted structure is a heat cured resin, a radiation cured resin, or an electron beam cured resin.

* * * * *